INVENTORS
K. Schwenk
E. Gallasch
H. Habitzel
F. Jacob
BY
Watson Cole Grindle + Watson
Attys.

3,579,727
FOAM MOULD
Kurt Schwenk, Ernst Gallasch, and Hermann Hablitzel, Wolfsburg, Hannover, and Friedrich Jacob, Steimke, Hannover, Germany, assignors to Volkswagenwerk A.G., Wolfsburg, Germany
Filed Dec. 4, 1968, Ser. No. 781,132
Claims priority, application Germany, Dec. 6, 1967, P 17 29 112.2
Int. Cl. B29d 12/00
U.S. Cl. 18—5P
3 Claims

ABSTRACT OF THE DISCLOSURE

A foam mould for the manufacture of the vehicle body from synthetic plastic material having a base plate with inner and outer mould halves arranged on the plate and subdivided into sections which are movable inwardly and outwardly respectively.

---

This invention relates to a foam mould for the manufacture of an automobile body from synthetic plastic materials, using the reaction injection moulding method.

Using this method, the two components of a polyurethane-durometer are injected through a mixing head into the mould cavity. After a comparatively short time, the mixture of the initial materials starts to react, with simultaneous expansion and pressure development. As a result, a smooth, hard surface layer is formed at the contact surfaces between the synthetic plastics material and the mould, while the intermediate layer shows the fine porous structure of a hard foam of conventional type. The mould pressures set up during the reaction amount to approximately 1 kg./cm².

The invention has for its object to provide a foam mould requiring compartively small space for a body to be manufactured by the above method and to construct this mould so that the body can be produced in one piece without mould cores and sliding bodies.

The invention consists in that bell-shaped inner and outer mould halves are provided for an upper body component which is in one piece, said halves being arranged on a base plate and being divided into sections which can be moved inwardly and outwardly, respectively. Those sections which are associated with the side walls, the front portion and the rear portion of the body are preferably pivotally mounted on the base plate by means of hinges, while the sections for a roof of the body are constructed like the parts of a forging press and consequently move vertically up and down. The lateral opposite sections of the mould halves can have common hinges and the pivot pins of these hinges form a rectangle in plan view.

The foam mould according to the invention has a compact construction. When removing the body, it is sufficient for the lateral mould sections only to be lifted to such an extent that the product becomes free. Since some of the parts of the mould are pivotable and some are displaceable, window openings, door recesses, undercut parts of the body, etc. are formed without inserted components and sliding bodies. This shortens the time of manufacture and assists the use of the foam mould in manufacture on a large scale. A further shortening of the manufacturing time can here also be obtained by the inner mould sections moving downwardly to such an extent that the body can be moved laterally out of the mould after a necessary slight lifting action.

Figure 1:
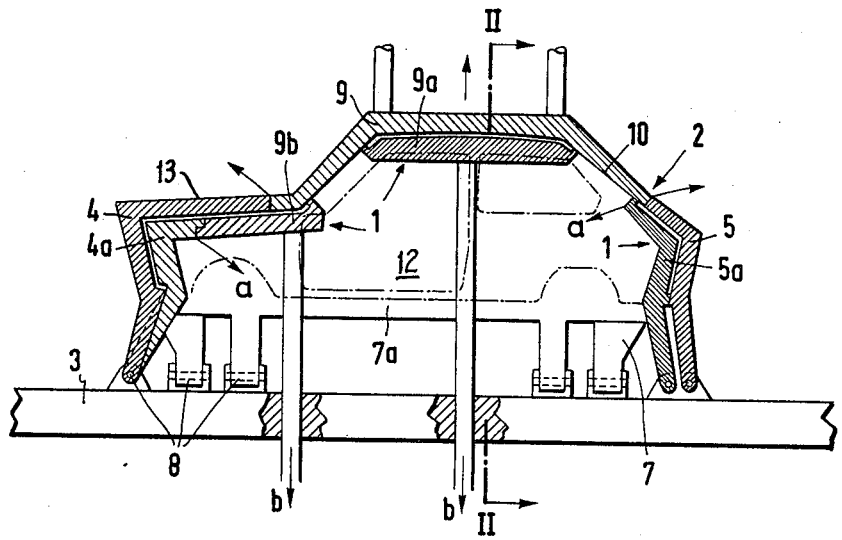
Figure 2:
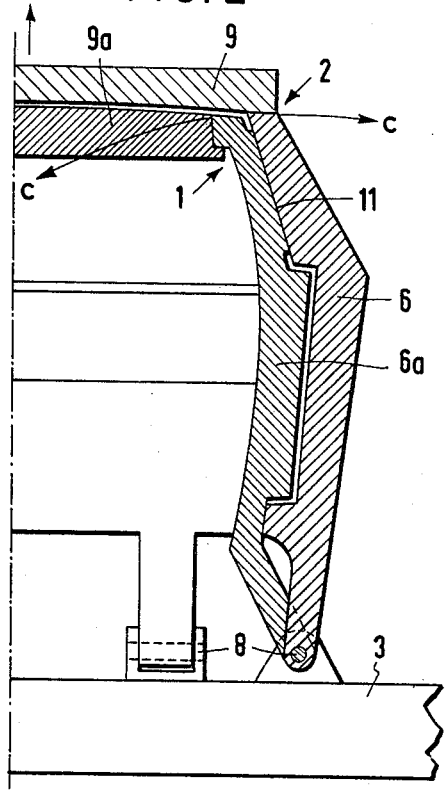

Further objects of the invention will be apparent from the following description when considered in connection with the accompanying drawing in which;

FIG. 1 is a longitudinal section of a foam mould, which extends over the front and rear wings and in the mean longitudinal plane of the vehicle to be manufactured, and FIG. 2 is a section on the line II—II of FIG. 1 in the direction of the arrows and on a larger scale.

In order to produce an upper part of a body in one piece, using the reaction injection moulding method mould halves 1 and 2, each of bell shape, are provided, the said halves completely enclosing the wall of the body from inside and outside. The mould halves 1 and 2 are subdivided into movable sections and are arranged by means of connecting elements, some of which are not shown, on a common base plate 3. The sections 4 and 4a for the front end or part, the sections 5 and 5a for the rear end or part and the sections 6 and 6a and 7 and 7a for the sides or side parts of the body are mounted to swivel inwardly and outwardly in hinges 8, while the sections 9, 9a and 9b for the roof and the apron move vertically upward or downward like parts of a forging press. In the region of the body openings for doors, windows, etc., the sections of the mould halves 1 and 2 bear tightly one against the other, so that no foam wall can be formed in this region (for example, positions 10 and 11). The directions of the arrows a, b and c indicate in which sequence the sections of the inner mould half 1 are hinged. Recesses (not shown) can be provided in the base plate 3, into which the sections 4a and 5a pivot.

With the foregoing arrangement it will be apparent that the assembled mould parts jointly enclose a space 12 which is of rectangular shape in plan, as determined by the relatively spaced pairs of cooperating end mould sections 4–4a and 5–5a, and side mould sections 6–6a and 7–7a.

The upper mould section 9 of the roof defining means, when operatively positioned, has its peripheral edge portions engaged with the upper edge portions of such side and end sections to close the upper end of such space, while the lower mould section 9a is movable upwardly through such space from a lower retracted position into operative relation with the upper mould section 9, as is shown in FIG. 1.

Also, as is shown in FIG. 1, the outer or front end mould section 4 includes a generally horizontal portion 13 which, in the operative position of the mould parts, projects inwardly over the space 12 and laterally abuts the upper mould section 9. The second lower mould section 9b is thus movable vertically through the space 12 into and from operative relation with both the portion 13 of mould section 4 and the adjacent abutting portion of the upper mould section 9 to define a portion of the mould cavity.

We claim:
1. A foam mould for the production of a plastic motor vehicle body by a reaction injection moulding process, comprising a horizontal base, relatively spaced pairs of inner and outer end sections, the sections of each pair being mounted on said base for angular movement about parallel horizontal axes, relatively spaced pairs of inner and outer side sections, the sections of each pair being mounted on said base for angular movement about relatively spaced parallel horizontal axes extending between and perpendicularly to said pairs of end sections, said inner and outer sections of each pair being swingable to and from operative relation with each other to define therebetween a portion of a mould cavity, said pairs of sections, when operatively related enclosing an upwardly open space of rectangular configuration in plan, an upper mould section movable vertically into and from an operative position over said space in engagement with the upper edge portions of said side and end sections, a lower mould section and means for moving same vertically from a lowered retracted position within said space upwardly through said space into operative relation with said upper mould section, said upper and lower mould sections when thus operative related, defining between them a further portion of the mould cavity.

2. A foam mould as defined in claim 1, wherein one of said outer end sections includes a generally horizontal portion projecting inwardly over said space and laterally abutting said upper mould section in the operative relation of said sections, there being a second lower mould section and means for vertically moving same through said space into and from an operative position in which said second lower mould section registers and cooperates with the abutting portions of said one outer end section and said upper mould section to define a portion of the mould cavity.

3. A foam mould as defined in claim 2, in which said end and side sections of each pair are mounted for angular movement about a common horizontal axis.

References Cited

UNITED STATES PATENTS

| | | | |
|---|---|---|---|
| 3,042,973 | 7/1962 | Brockhues et al. | 18—5(P)X |
| 3,217,356 | 11/1965 | Stutsman | 249—162X |
| 3,298,656 | 1/1967 | Zastrow | (18)—(5P) |
| 3,380,703 | 4/1968 | Zastrow | 18—5(P)X |
| 3,419,648 | 12/1968 | Leach | 18—5(P)X |

WILLIAM S. LAWSON, Primary Examiner

U.S. Cl. X.R.

18—34; 249—162